United States Patent [19]
Evans et al.

[11] Patent Number: 5,010,143
[45] Date of Patent: Apr. 23, 1991

[54] METHOD FOR PREPARING BLOCK POLYPHENYLENE ETHER-POLYCARBONATES

[75] Inventors: Thomas L. Evans, Clifton Park; Carol B. Wasserman, Hartsdale; Timothy J. Shea, Schenectady; John R. Campbell, Clifton Park, all of N.Y.

[73] Assignee: General Electric Company, Schenectady, N.Y.

[21] Appl. No.: 124,127

[22] Filed: Nov. 23, 1987

[51] Int. Cl.⁵ .................... C08G 65/48; C08G 69/00; C08G 71/12
[52] U.S. Cl. .................................. 525/394; 525/68; 525/905
[58] Field of Search ........................ 525/394, 905

[56] References Cited
U.S. PATENT DOCUMENTS 3,875,256  4/1975  White ................................... 525/394
4,605,731  8/1986  Evans et al. ......................... 525/394
4,760,117  7/1988  Evans et al. .

FOREIGN PATENT DOCUMENTS 0230603  12/1986  European Pat. Off. .
1026148   4/1966  United Kingdom ............... 525/394

Primary Examiner—Jacob Ziegler
Attorney, Agent, or Firm—William H. Pittman; James C. Davis, Jr.

[57] ABSTRACT

Block polyphenylene ether-polycarbonates are prepared by blending a mixture of at least one polyphenylene ether wherein all phenolic end groups are in the free phenol form; at least one cyclic polycarbonate oligomer, preferably an oligomer mixture; and a catalyst for conversion of cyclic polycarbonates to linear polycarbonates; and heating said mixture to polymerization temperature. The preferred catalysts are phenoxides, salts of polycarbonate oligomers and tetraphenylborate salts. The method may be conducted in the melt or in solution, and is adaptable for employment in reactive processing operations.

18 Claims, No Drawings

METHOD FOR PREPARING BLOCK POLYPHENYLENE ETHER-POLYCARBONATES

This invention relates to the preparation of block polyphenylene ether-polycarbonates, and more particularly to a method for their preparation which is adaptable for practice in a homogeneous medium.

Block polyphenylene ether-polycarbonates are well known in the art, being disclosed, for example in U.S. Pat. Nos. 4,374,233, 4,436,876 and 4,463,132. The known methods for their preparation are, for the most part, conventional interfacial polycarbonate methods in which the polyphenylene ether is incorporated. Such methods ordinarily employ such water-immiscible liquids as methylene chloride as solvents. The use of methylene chloride is a complicating factor when a polyphenylene ether is present, since polyphenylene ethers form insoluble complexes with methylene chloride under many conditions.

Copending, commonly owned application Ser. No. 907,557, filed Sept. 15, 1986 now U.S. Pat. No. 4,760,117, discloses a method for preparing numerous types of copolycarbonates by the ringopening of aromatic cyclic polycarbonate oligomer compositions with polymers containing nucleophilic moieties. Among the suitable polymers are polyphenylene ethers, on which the nucleophilic moieties are salt derivatives of the terminal hydroxy groups. This method requires an initial step of forming the polyphenylene ether salt, and is therefore generally unsuitable for employment in such reactive processing operations as pultrusion, rotational molding and extruder polymerization.

The present invention provides a superior method for preparing block polyphenylene ether-polycarbonates in a homogeneous medium. It may be employed in reactive processing operations, requiring no or a minimum of extraneous steps.

The invention is a method for preparing a block polyphenylene ether-polycarbonate which comprises preparing a mixture comprising:

(A) at least one cyclic polycarbonate oligomer, (B) at least one polyphenylene ether wherein all phenolic end groups are in the free phenol form, and (C) a catalyst for conversion of cyclic polycarbonates to linear polycarbonates, said catalyst being other than a salt of a polyphenylene ether;

and heating said mixture at a temperature in the range of about 175°–350° C.

The cyclic polycarbonate oligomer compositions useful as reagent A in the method of this invention comprise a plurality of structural units of the formula

wherein at least about 60% of the total number of $R^1$ values are divalent aromatic organic radicals, the balance thereof being aliphatic, alicyclic or aromatic organic radicals. Such compositions include dimers, trimers and tetramers of the type disclosed in the following U.S. Pat. Nos. 3,155,683, 3,386,954, 3,274,214, 3,422,119.

Also included, and generally preferred, are cyclic polycarbonate oligomer mixtures. Such mixtures and methods for their preparation are disclosed in U.S. Pat. No. 4,644,053 and in copending, commonly owned applications Ser. No. 871,641, filed June 6, 1986, now U.S. Pat. No. 4,727,184 and Ser. No. 888,673, filed July 24, 1986, now U.S. Pat. No. 4,740,583, the disclosures of which are incorporated by reference herein.

The $R^1$ values may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 80% of the total number of $R^1$ values in the cyclic oligomer mixtures, and most desirably all of said $R^1$ values, are aromatic. The aromatic $R^1$ radicals preferably have the formula $$(II) \quad -A^1-Y-A^2-$$

wherein each of $A^1$ and $A^2$ is a monocyclic divalent aromatic radical and Y is a bridging radical in which one or two atoms separate $A^1$ from $A^2$. The free valence bonds in formula I are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 10% by weight, and most often no more than about 5%, of such linear oligomers (if any) are present. The mixtures also usually contain low percentages, if any (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins.

The polyphenylene ethers useful as reagent B comprise a plurality of structural units having the formula

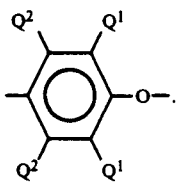

(III)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 10,000–60,000, as determined by gel permeation chromatography. Its intrinsic viscosity is most often in the range of about 0.1–0.6 and preferably 0.2–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. No. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Many polyphenylene ethers comprise molecules having at least one of the end groups of the formulas

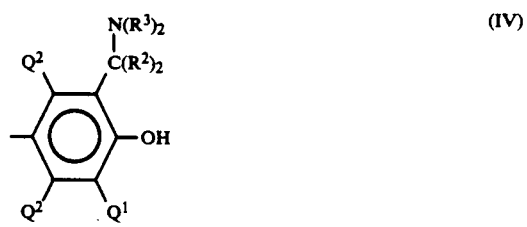

(IV)

and

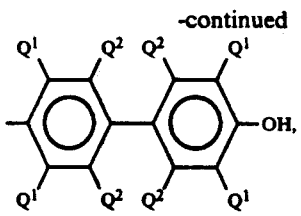
(V)

wherein $Q^1$ and $Q^2$ are as previously defined; each $R^2$ is wherein Q independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula IV may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

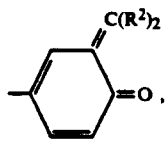
(VI)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are typically obtained from reaction mixtures in which a by-product diphenoquinone of the formula

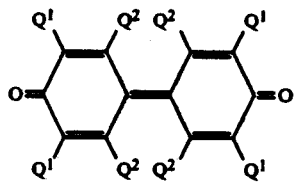
(VII)

is present, especially in a copper-halide-secondary or tertiary amine system. In this regard, the disclosures of U.S. Pat. No. 4,234,706, 4,477,649 and 4,482,697 are particularly pertinent and are incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas IV and V. Under certain conditions, such as relatively high temperatures, blocks involving groups of formula IV may be relatively unstable. If it is desired to avoid the formation of such end groups, an oxidative coupling catalyst other than one which leads to their formation may be used or the aminoalkyl end groups may be inactivated by chemical treatment. It should be noted, however, that salt formation and the reaction leading to the block polyphenylene ether-polycarbonate may be undergone by hydroxy-containing end groups of a higher degree of stability in the same or different polymer molecules. Therefore, the presence of aminoalkyl end groups does not foreclose the practice of this invention.

It will be apparent to those skilled in the art from the foregoing that the polyphenylene ethers contemplated for use in the present invention include all those presently known, irrespective of variations in structural units or ancillary chemical features.

The invention contemplates the use as reagent B of polyphenylene ethers in which all phenolic end groups are in the free phenol form; that is, none are in the salt form. It will become apparent hereinafter that the use of such polyphenylene ethers permits more latitude in polymerization conditions than is the case when a polyphenylene ether salt is employed, as disclosed in the aforementioned application Ser. No. 907,557.

Reagent C is a catalyst for conversion of cyclic polycarbonates to linear polycarbonates. Any known catalyst for this purpose may be used with the sole exception of salts of polyphenylene ethers, which are not contemplated.

Polycarbonate formation catalysts useful with cyclics are disclosed in many patents and publications. They include the bases and Lewis acids of the aforementioned U.S. Pat. No. 4,644,053; the tetraarylborates of U.S. Pat. No. 4,605,731; the phenoxide-terminated polymers and especially polycarbonates of copending, commonly owned application Ser. No. 941,901, filed Dec. 15, 1986, now U.S. Pat. No. 4,701,519; and the unsubstituted and substituted phenylacetates of copending, commonly owned application Ser. No. 44,376, filed Apr. 27, 1987, now U.S. Pat. No. 4,778,875. Especially preferred for many purposes are phenoxide salts, especially sodium phenoxide; salts of polycarbonate oligomers, preferably lithium salts; and tetraphenylborate salts, preferably tetraalkylammonium tetraphenylborates.

In the first step of the method of this invention, a mixture comprising reagents A, B and C is prepared. Most often, said mixture consists essentially of said reagents; that is, they are the only components contributing materially to the novel and essential features of the mixture.

The proportions of cyclics and polyphenylene ether are not critical and may be varied in accordance with the properties desired in the product. In general, a weight ratio of reagent A to reagent B in the range of about 1–10:1 is suitable. The proportion of reagent C is most often about 0.001–1.0 mole percent based on carbonate units in reagent A.

The mixture may be prepared by conventional blending methods, provided they do not involve conditions which will lead to premature polymerization of reagent A. Thus, dry blending may be employed, or the reagents may be dissolved in a relatively volatile common solvent and the solvent may then be removed by evaporation. Suitable solvents for this purpose include chloroform and methylene chloride; however, if methylene chloride is used care should be taken to avoid its prolonged contact with the polyphenylene ether, to avoid precipitation of a polyphenylene ether-methylene chloride complex.

It is also within the scope of the invention to dissolve the reagents in a solvent which serves as a reaction medium. Relatively high boiling solvents, such as chlorobenzene, o-dichlorobenzene and 1,2,4-trichlorobenzene, are ordinarily employed for solution polymerization.

In the second step, the mixture thus obtained is heated to a temperature in the range of about 175°–350° C. at which polymerization of reagent A takes place. This step may be conducted in the melt or, as previously indicated, in solution, under conventional conditions for melt or solution polymerization.

While the invention is not dependent on theory, it is believed that the first step in formation of the block polyphenylene ether-polycarbonate is the initiation of polymerization of reagent A by the action of reagent C. This results in the formation of a "living" anionic polymer, typically with phenate end groups. An exchange then takes place between said phenate end groups and reagent B, which is itself converted to a phenate anion-terminated polyphenylene ether. The latter then further reacts with reagent A, producing the desired block copolymer.

The method of this invention produces block copolymers in which both the polyphenylene ether and polycarbonate moieties may have relatively high molecular weights. The proportion of block polyphenylene ether-polycarbonate in the product may be analytically determined, at least approximately, by either or both of two methods. In the first method, the molecular weight of the polyphenylene ether is determined initially and at intervals during cyclics polymerization, using an ultraviolet detector which measures the absorption at 254 nanometers. Poly(2,6-dimethyl-1,4-phenylene ether) absorbs much more strongly at this wavelength then bisphenol A polycarbonate. In the second method, the product is treated with excess methylene chloride, whereupon the polyphenylene-rich portion thereof precipitates as a complex. After removal of the methylene chloride by heating, the proportions of polycarbonate and polyphenylene ether in the soluble and insoluble fractions is determined by proton nuclear magnetic resonance. Any polycarbonate in the insoluble fraction and any polyphenylene ether in the soluble fraction may be assumed to be the result of copolymer formation.

By reason of its adaptability to homogeneous polymerization conditions, including melt polymerization, the method of this invention is particularly adaptable to reactive processing methods. These include, as previously mentioned, such operations as pultrusion, rotational molding and extruder polymerization.

The invention is illustrated by the following examples. All percentages are by weight. The cyclic polycarbonate composition used in each example was a mixture of bisphenol A cyclic polycarbonate oligomers, principally having degrees of polymerization from 2 to about 6; molar proportions thereof are in terms of carbonate units. The polyphenylene ethers were poly(2,6-dimethyl-1,4-phenylene ethers). Intrinsic viscosities (IV) were measured in chloroform at 25° C. Molecular weights are weight average unless otherwise indicated and were determined by gel permeation chromatography relative to polystyrene.

EXAMPLE 1–4

Solutions in 80 ml. of dry o-dichlorobenzene of 8 grams of combined cyclic polycarbonates and polyphenylene ethers having various intrinsic viscosities and 22 microliters of a 0.10 M solution of sodium phenoxide in tetrahydrofuran were heated under reflux for 2 hours, with stirring. Crude products were isolated by pouring the mixture into an excess of methanol containing a small amount of sulfuric acid.

Five-gram samples of the crude products were warmed with 100 ml. of methylene chloride until it had dissolved. The solutions were refrigerated for 4 hours, the solid polyphenylene ether-methylene chloride complexes which precipitated were separated by filtration, the filtrates were vacuum stripped and the complexes were heated to drive off methylene chloride. The results of analysis (by nuclear magnetic resonance as described hereinabove) are given in Table I.

TABLE I

|  | Example | | | |
|---|---|---|---|---|
|  | 1 | 2 | 3 | 4 |
| Wt. ratio, cyclics/polyphenylene ether | 3:1 | 1.5:1 | 6:1 | 3:1 |
| Polyphenylene ether IV, dl./g. | 0.22 | 0.22 | 0.22 | 0.4 |
| Molecular weight of crude product | 50,000 | 50,000 | 65,600 | 94,800 |
| Soluble fraction: | | | | |
| % | 97 | 74 | 100 | 15* |
| Mol. wt. | 42,700 | — | — | — |
| % polyphenylene ether | 22 | 27 | 15 | 19 |
| Insoluble fraction: | 36 | 31 | — | 41 |
| % polycarbonate | | | | |

*Product included 54% gel which was insoluble in methylene chloride even upon heating.

EXAMPLES 5–7

A lithium phenoxide-terminated polycarbonate oligomer mixture having a number average molecular weight of about 10,700 was prepared by heating a mixture of 50 parts of a bisphenol A polycarbonate having a number average molecular weight of about 15,600 with 0.2 part of lithium phenoxide for 30 minutes under nitrogen, in a Helicone vertical mixer. Mixtures of 8 grams of combined cyclic polycarbonates and polyphenylene ether having an IV of 0.22 dl./g. and 295 mg. (0.1 mole percent based on cyclics) of the lithium phenoxide-terminated polycarbonate were dissolved in 100 ml. of methylene chloride, after which the methylene chloride was removed by vacuum stripping and the resulting mixtures were dried in a nitrogen-purged vacuum oven for 4 hours at 110° C.

The mixtures were heated at 300° C. for 15 minutes, under nitrogen. The products were dissolved in methylene chloride, precipitated by pouring into methanol, and treated via methylene chloride complexation as described in Examples 1–4. The results are given in Table II.

TABLE II

|  | Example | | |
|---|---|---|---|
|  | 5 | 6 | 7 |
| Wt. ratio, cyclics/polyphenylene ether | 6:1 | 3.1 | 1.5:1 |
| Molecular wt. of crude product | 68,800 | 58,400 | 15,600 |
| Soluble fraction: | | | |
| % | 87 | 90 | 56 |
| Mol. wt. | — | 53,700 | — |
| % polyphenylene ether | 11 | 21 | 8 |

TABLE II-continued

| | Example | | |
|---|---|---|---|
| | 5 | 6 | 7 |
| Insoluble fraction: | | | |
| Mol. wt. | — | 32,400 | — |
| % polycarbonate | 28 | 24 | 8 |

EXAMPLES 8-9

The procedure of Examples 5-7 was repeated, substituting tetra-n-butylammonium tetraphenylborate for the lithium phenoxide-terminated polycarbonate on an equimolar basis. The results are given in Table III.

TABLE III

| | 8 | 9 |
|---|---|---|
| Wt. ratio, cyclics/polyphenylene ether | 6:1 | 3:1 |
| Molecular wt. of crude product | 117,000 | 41,600 |
| Soluble fraction: | | |
| % | 87 | 84 |
| % polyphenylene ether | 15 | 14 |
| Insoluble fraction: | 28 | 24 |
| % polycarbonate | | |

EXAMPLES 10-14

Mixtures of 100 grams of cyclics with 100 grams of various polyphenylene ethers and 0.1 mole percent, based on cyclics, of tetra-n-butylammonium tetraphenylborate (Examples 10-13) or tetra-n-butylammonium tetraphenoxyborate (Example 14) were prepared by dry blending. The mixtures were extruded in a twin-screw extruder at temperatures from 200° to 350° C. and a residence time of about 5 minutes. The extrudates were treated via methylene chloride complexation as described in Examples 1-4, and the molecular weights of the complexed fractions were determined. The results are given in Table IV.

TABLE IV

| | Example | | | | |
|---|---|---|---|---|---|
| | 10 | 11 | 12 | 13 | 14 |
| Polyphenylene ether IV, dl./g. | 0.45 | 0.22 | 0.22 | 0.15 | 0.15 |
| % polyphenylene ether in soluble fraction | — | 9 | — | — | — |
| Insoluble fraction: | | | | | |
| Mol. wt. | 67,900 | 223,000 | 40,400 | 19,100 | 16,700 |
| % polycarbonate | 10 | 28 | 18 | 14 | 19 |

What is claimed is:

1. A method for preparing a block polyphenylene ether-polycarbonate which comprises preparing a mixture comprising:
   (A) at least one cyclic polycarbonate oligomer,
   (B) at least one polyphenylene ether wherein all phenolic end groups are in the free phenol form, and
   (C) a catalyst for conversion of cyclic polycarbonates to linear polycarbonates, said catalyst being other than a salt of a polyphenylene ether;
   and heating said mixture at a temperature in the range of about 175°-350° C.

2. A method according to claim 1 wherein reagent B is a poly(2,6-dimethyl-1,4-phenylene ether).

3. A method according to claim 2 wherein reagent A is a cyclic polycarbonate oligomer mixture.

4. A method according to claim 3 wherein the cyclic polycarbonates comprise a plurality of structural units of the formula

wherein at least about 60% of the total number of $R^1$ values are divalent aromatic organic radicals, the balance thereof being aliphatic, alicyclic or aromatic organic radicals.

5. A method according to claim 4 wherein the mixture consists essentially of reagents A, B and C.

6. A method according to claim 5 wherein all the $R^1$ radicals have the formula

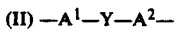

wherein each of $A^1$ and $A^2$ is a monocyclic divalent aromatic radical and Y is a bridging radical in which one or two atoms separate $A^1$ from $A^2$.

7. A method according to claim 6 wherein $A^1$ and $A^2$ are each p-phenylene and Y is isopropylidene.

8. A method according to claim 3 wherein the weight ratio of reagent A to reagent B is in the range of about 1-10:1.

9. A method according to claim 8 wherein reagent C is employed in the amount of about 0.001-1.0 mole percent based on carbonate units in reagent A.

10. A method according to claim 3 wherein the heating step is conducted in solution.

11. A method according to claim 3 wherein the heating step is conducted in the melt.

12. A method according to claim 3 wherein reagent C is a phenoxide salt, a salt of a polycarbonate oligomer or a tetraphenylborate salt.

13. A method according to claim 12 wherein reagent C is sodium phenoxide.

14. A method according to claim 12 wherein the catalyst is a lithium salt of a bisphenol A polycarbonate oligomer.

15. A method according to claim 12 wherein reagent C is a tetraalkylammonium tetraphenylborate.

16. A method according to claim 12 wherein the cyclic polycarbonates comprise a plurality of structural units of the formula

wherein at least about 60% of the total number of $R^1$ values are divalent aromatic organic radicals, the balance thereof being aliphatic, alicyclic or aromatic organic radicals.

17. A method according to claim 16 wherein all the $R^1$ radicals have the formula

each of $A^1$ and $A^2$ is a monocyclic divalent aromatic radical and Y is a bridging radical in which one or two atoms separate $A^1$ from $A^2$.

18. A method according to claim 17 wherein $A^1$ and $A^2$ are each p-phenylene and Y is isopropylidene.

* * * * *